(12) United States Patent
Kotwicki et al.

(10) Patent No.: US 7,793,620 B2
(45) Date of Patent: Sep. 14, 2010

(54) INTEGRATED GASEOUS FUEL DELIVERY SYSTEM

(75) Inventors: Allan Kotwicki, Williamsburg, MI (US); Donald J. Lewis, Howell, MI (US); Brad Boyer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 906 days.

(21) Appl. No.: 11/609,276

(22) Filed: Dec. 11, 2006

(65) Prior Publication Data

US 2008/0135005 A1    Jun. 12, 2008

(51) Int. Cl.
    *F02B 43/00* (2006.01)
(52) U.S. Cl. ...................... 123/1 A; 123/527
(58) Field of Classification Search ................ 123/1 A, 123/DIG. 3, 525, 527, DIG. 12
    See application file for complete search history.

(56) References Cited

U.S. PATENT DOCUMENTS

| | | | |
|---|---|---|---|
| 6,186,168 B1 * | 2/2001 | Schultz et al. | 137/505.11 |
| 6,302,144 B1 | 10/2001 | Graham et al. | |
| 6,343,476 B1 * | 2/2002 | Wang et al. | 62/46.1 |
| 6,571,978 B1 | 6/2003 | Puempel et al. | |
| 6,634,342 B1 | 10/2003 | Wouters et al. | |
| 6,698,475 B2 | 3/2004 | Schaefer et al. | |
| 7,111,452 B2 * | 9/2006 | Miyoshi et al. | 123/DIG. 12 |
| 2003/0213521 A1 * | 11/2003 | Downie | 137/505.33 |
| 2004/0154314 A1 | 8/2004 | Fischer et al. | |
| 2005/0211325 A1 * | 9/2005 | Takagi et al. | 138/121 |

* cited by examiner

*Primary Examiner*—Noah Kamen
(74) *Attorney, Agent, or Firm*—Allan J. Lippa; Alleman Hall McCoy Russell & Tuttle LLP

(57) ABSTRACT

An integrated gaseous fuel delivery system is provided. The system includes a storage tank to hold a gaseous fuel and a pressure regulation system disposed interior the storage tank and configured to regulate a pressure of gaseous fuel delivered from the storage tank.

19 Claims, 4 Drawing Sheets

INTEGRATED GASEOUS FUEL DELIVERY SYSTEM

FIELD

The present application relates to systems, apparatus and methods for an integrated gaseous fuel delivery system.

BACKGROUND AND SUMMARY

In an attempt to reduce emissions, efforts have been made to utilize substantially carbon-free hydrogen as a combustion fuel instead of hydrocarbons. When hydrogen (H2) is used as the fuel, there is not a substantial amount of HC, CO, or CO2 emissions, because the fuel does not include carbon that can be turned into HC, CO, or CO2. Therefore, hydrogen fuel is currently viewed as a potentially good fuel choice for environmentally clean internal combustion engines.

Hydrogen can also be used as an energy source by a variety of other devices. For example, a fuel cell can convert hydrogen into electrical energy using an environmentally clean reaction.

Although hydrogen fuel systems may be an environmentally desired option over hydrocarbon systems, hydrogen systems may suffer from hydrogen leakage. Specifically, hydrogen is a small molecule that is capable of passing through material pores, very small system openings, and/or seal asperities. When designing a hydrogen fuel delivery system (e.g., for an internal combustion engine, fuel cell, or other device), every connection or penetration of the boundary of the fuel delivery system may be a possible hydrogen release path. In particular, if hydrogen is stored as high pressure gas, high pressure connections (e.g., the first or second high pressure reducing regulators, fuel pressure sensing or quantity gauging, and/or any electrical or manual shutoff devices) may be susceptible to hydrogen leakage.

In the past, attempts have been made to mitigate hydrocarbon fuel leakage by completely enveloping portions of a fuel delivery system in a capsule, or by creating secondary seals and/or containment chambers around connections and boundaries of the fuel delivery system. For example, U.S. Pat. No. 6,571,978 discloses one such approach for reducing the amount of hydrocarbons which are given off to the ambient atmosphere.

Further, as another example, United States Patent Publication Number 2004/0154314 discloses a capsule that is designed to trap hydrogen gas that escapes a liquid hydrogen cryotank fuel delivery system. As with the hydrocarbon fuel delivery system described above, this approach merely attempts to mitigate the harmful affects of leakage by containing the leakage so that it can be treated before being released to the atmosphere.

The inventors herein have recognized the need to reduce or limit fuel leakage and potential drawbacks with current approaches for a hydrogen or gas-based system. As described above, each coupling in a hydrogen system may be a potential hydrogen leakage point. Further, some current systems use intermediate containment areas in an attempt to control gaseous fuel leakage. However, dangerous gases may accumulate in the intermediate containment areas and a venting system may be needed to handle the leaked gases. The intermediate containment capsule, the venting system, and/or other aspects of such a system may increase cost and/or limit spatial design freedom. Furthermore, any fuel leakage may reduce overall fuel efficiency.

As an example, at least some of the issues associated with gaseous fuel leakage may be addressed by a fuel delivery system that includes limited connections at which fuel may leak from the system. As an example, a storage tank may be used to hold a gaseous fuel, and the fuel may be converted by a powerplant to energy that is useable to power a vehicle. The fuel stored in the tank may be delivered to the powerplant by an uninterrupted passage fluidically coupling the storage tank to the powerplant. In some embodiments, a pressure regulation system may be located interior the storage tank. The pressure regulation system may decrease or increase the pressure of the gaseous fuel so that the gaseous fuel is suitable for delivery to the powerplant.

In this manner, the number of connections intermediate the fuel tank and the powerplant may be limited, thus minimizing opportunities for gaseous fuel to leak from the system. Because the pressure regulation system is physically located within the storage tank, any leakage that occurs in the pressure regulation system may return to the storage tank. By using an integrated fuel delivery system, gas leakages may be reduced and fuel efficiency improved.

DETAILED DESCRIPTION

Figure 1:
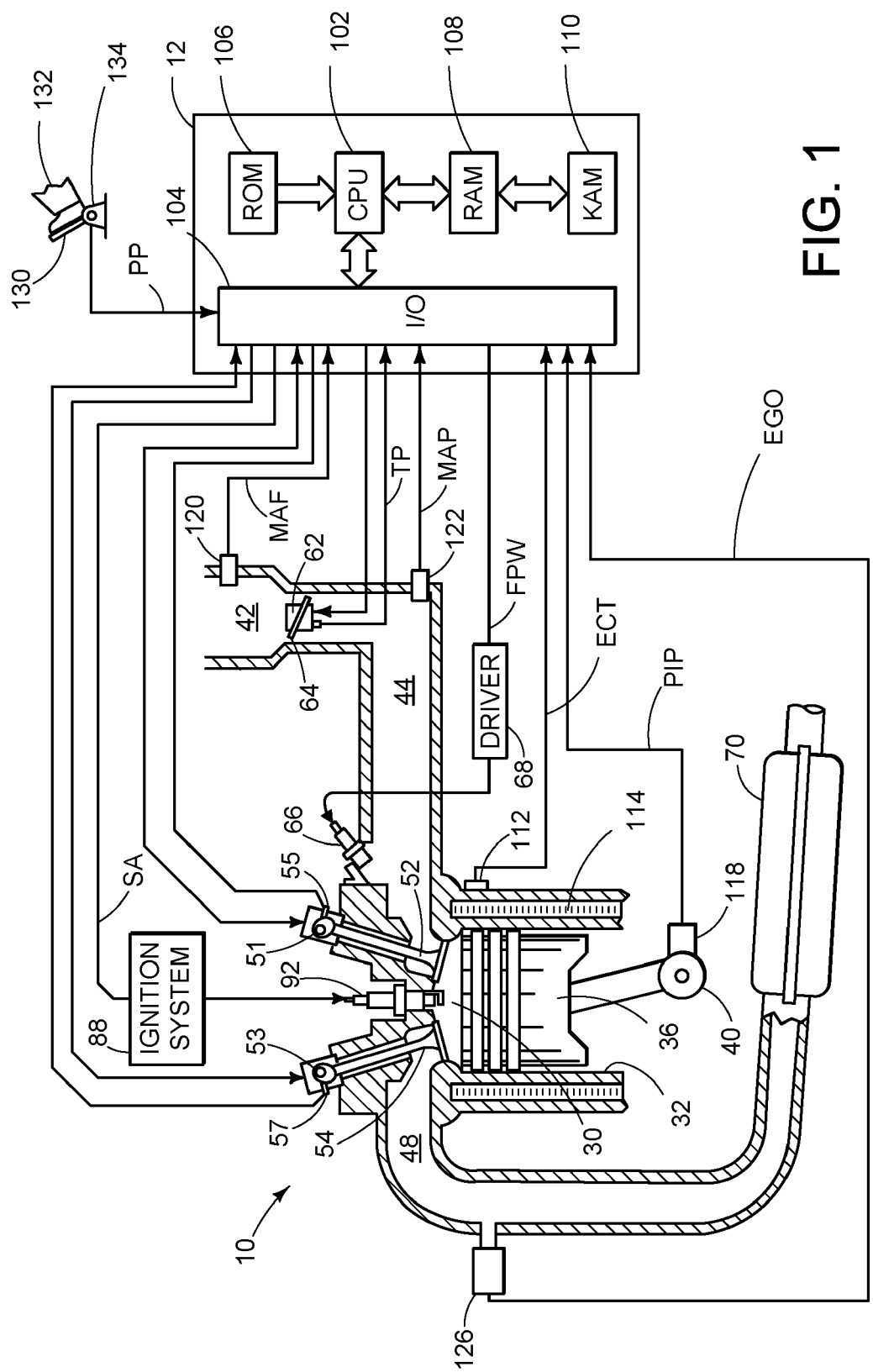
FIG. 1 is a schematic depiction of an exemplary embodiment of a vehicle including a gaseous fuel power system.

FIG. 1 is a schematic diagram showing one cylinder of multi-cylinder engine 10, which may be included in a propulsion system of an automobile. The configuration of engine 10 is merely exemplary, and the systems and methods described herein may be implemented in any other suitable engine. Moreover, as described, engine 10 may include a gaseous fuel system. Hydrogen gas is a nonlimiting example of a gaseous fuel that can be used with the fuel delivery system of the present disclosure. It should be noted that hydrogen may be pure hydrogen or it may be a mixture of hydrogen and another gas, such as another gaseous fuel. Further, in some examples, the gaseous fuel, e.g. hydrogen, may be used in combination or mixed with liquid fuel such as gasoline or diesel fuel. Thus, while the examples herein describe a hydrogen fuel delivery system, other gaseous fuels systems may be substituted for or used in combination with hydrogen, if desired.

Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of the passenger vehicle via a transmission system. Further, a starter motor may be coupled to crankshaft 40 via a flywheel to enable a starting operation of engine 10.

Combustion chamber 30 may receive intake air from intake passage 44 via intake manifold 42 and may exhaust combustion gases via exhaust passage 48. Intake passage 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown arranged in intake passage 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a gaseous fuel system (not shown), such as a gaseous hydrogen fuel system, including a fuel tank, a fuel pump, and a fuel rail.

In some embodiments, combustion chamber 30 may alternatively or additionally include a fuel injector coupled directly to combustion chamber 30 for injecting fuel directly therein, in a manner known as direct injection. For example, the fuel injector may be mounted in the side of the combustion chamber or in the top of the combustion chamber, for example.

Intake manifold 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake manifold 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

As described above, FIG. 1 shows one cylinder of a multicylinder engine, and each cylinder may similarly include its own set of intake/exhaust valves, fuel injector, spark plug, etc.

Figure 2:
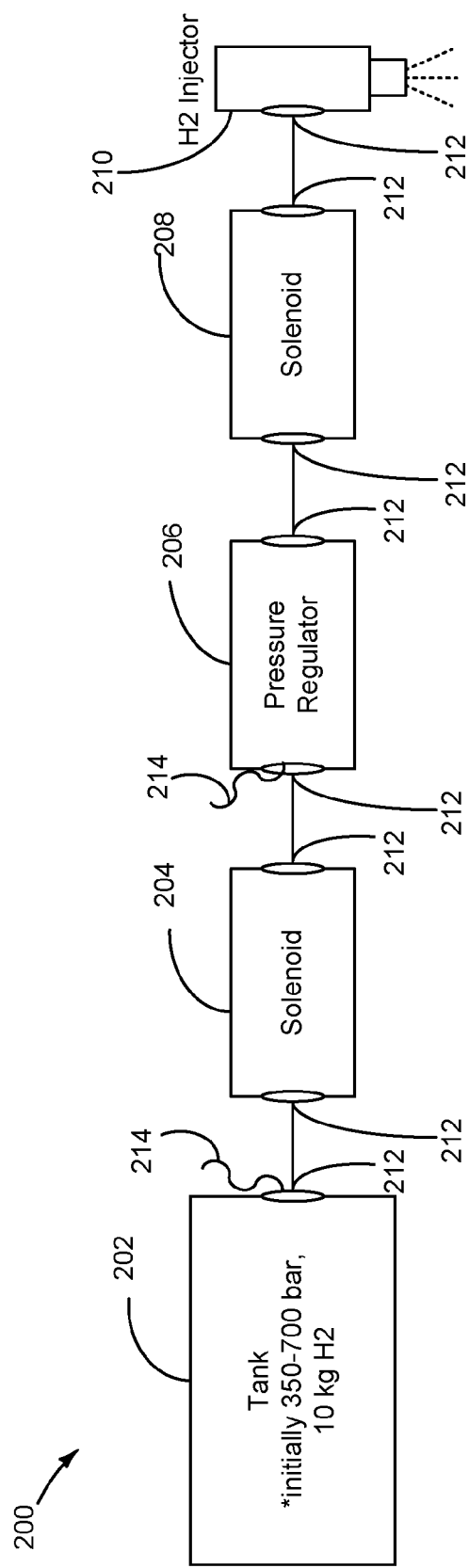
FIG. 2 is a schematic diagram of a conventional gaseous fuel delivery system.

Turning now to FIG. 2, a conventional gaseous fuel delivery system, 200, is illustrated. In the conventional system, a tank 202 is provided which stores fuel at maximum pressures of 350 to 700 bar. Such tanks are generally high-strength tanks configured to withstand the required pressure for storage of the gaseous fuel. The tank may include various couplings which define a fuel pathway to an injector, such as an H2 injector. For example, a hydrogen fuel pathway from tank 202 may include passage through the following fuel delivery system components: solenoid 204, a pressure regulator 206, and one or more additional solenoids 208 to H2 injector 210. Each of these components are external the tank 202. As illustrated, between each fuel delivery system component, one or more couplings or connections 212 are used to link the fuel delivery system components. Each of these couplings results in a potential gaseous fuel leakage zone.

For example, with a hydrogen based system, hydrogen is a very small molecule that is capable of passing through material pores, small system openings and seal asperities. Thus, every connection in the conventional gaseous fuel delivery system 200 is a potential hydrogen release path. In particular, in the conventional hydrogen fuel delivery system, as the hydrogen is stored as a high pressure gas, high pressure connections (e.g., the first or second high pressure reducing regulators, fuel pressure sensing or quantity gauging, and/or any electrical or manual shutoff devices) may be susceptible to hydrogen leakage. Moreover, time, corrosion, or physical movement may cause additional leakage at each fuel delivery system component interface. Further, production manufacturing variations, service procedures, and or combinations of manufacturing variations and service procedures may further increase risks of interface gas leakage. Thus, in FIG. 2, for illustrative purposes, reference indicator 214 indicates release of hydrogen along the interface between the tank 202 and solenoid 204. It should be appreciated that similar hydrogen release paths may be formed at the interfaces between each fuel delivery system component.

Figure 3:
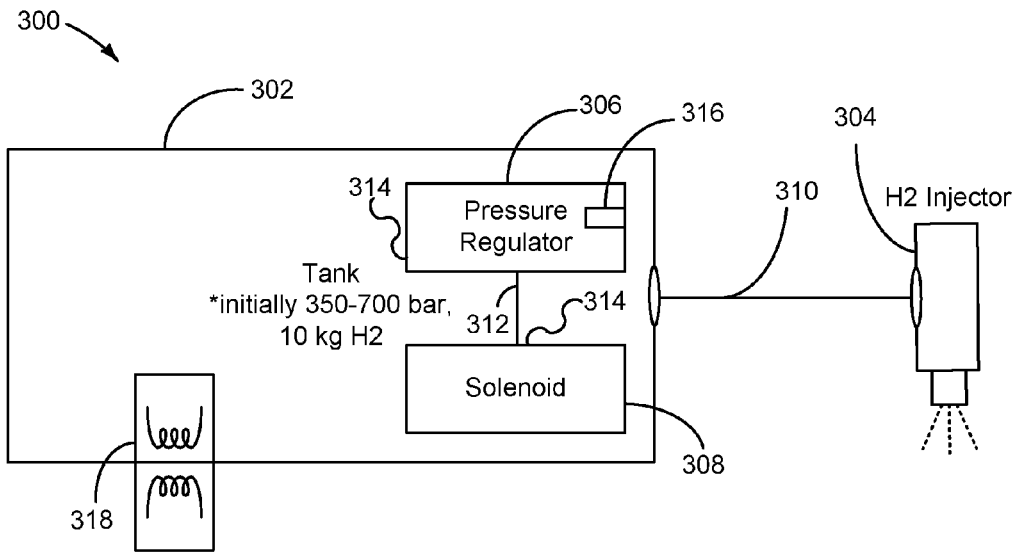
FIG. 3 is a schematic diagram of an exemplary embodiment of an integrated gaseous fuel delivery system.

Turning now to FIG. 3, a schematic diagram of an exemplary embodiment of an integrated gaseous fuel delivery system 300 according to the present disclosure is provided. The gaseous fuel delivery system may be incorporated in a vehicle, such as a vehicle including an engine similar to the one described above in regards to FIG. 1. For example, in some embodiments, the gaseous fuel supply system may be integrated with the engine such that the system delivers fuel to a fuel injector, such as a hydrogen injector. Although described in regards to a hydrogen system, it should be appreciated that the system may be used for any suitable gaseous fuel system, including combination hydrogen systems, or systems utilizing gases other than hydrogen. Further, it should be noted that hydrogen may be pure hydrogen or it may be a mixture of hydrogen and another gas, such as another gaseous fuel. The hydrogen may also be in combination with a liquid fuel such as gasoline or diesel fuel.

Integrated gaseous fuel delivery system 300 includes a tank 302 and a fuel injector 304, such as an H2 tank and an H2 injector. Tank 302 may be adapted to stores fuel at a storage pressure of 350 to 700 bar. The tank may be a high-strength tank, such as a carbon fiber tank. The tank may include various couplings which define a fuel pathway to an injector, such as an H2 injector. An interface 310 may exist between tank 302 and injector 304. Gas may exit the tank at a regulated pressure suitable for use by the injector or other device.

In the present embodiment, tank 302 may include substantially all of the fuel delivery components, including, but not limited to, pressure regulators 306, one or more solenoids 308, electrical or manual shutoff devices, fuel pressure sensing or quantity gauging, etc., which may be contained or substantially contained within tank 302. Piping and connections between the fuel delivery components are also retained within the tank, such as exemplary connection 312. Delivery of the fuel from the fuel tank is provided at a desired regulated pressure for use in the engine or other system. The fuel delivery components adapted to regulate the pressure for use by the engine may be considered the pressure regulation system. As such the pressure regulation system is contained within tank 302 such that the gas is output at a select pressure to the engine or other system. Any leakage between the fuel delivery components 314 should occur within the tank 302 itself, thereby recycling the leaked fuel and reducing overall loss of fuel from the system as the leaked fuel is retained within the system.

As discussed above, the integrated gaseous fuel delivery system may include a single output to the fuel injector. The integrated system thus reduces the number of potential gas release pathways in comparison to a conventional fuel delivery system, such as the system shown in FIG. 2. Further, any gas that leaks from the fuel delivery system prior to delivery to the fuel injector is leaked into the tank, thus resulting in little or no loss in fuel during delivery.

Moreover, in the present integrated system, any leaked gas along the fuel delivery pathway occurring inside the tank is retained within the tank. Thus, the integrated system avoids the use of a secondary or intermediate containment area. As discussed above, dangerous gases may accumulate in such intermediate containment areas and a venting system may be needed to handle the leaked gases. Further, such intermediate containment areas and associated venting systems may increase cost and result in overall reduction in fuel efficiency.

As such, it is noted that some integrated systems provide increased safety levels in regards to use of a gaseous fuel system. For example, containment of the gaseous fuel delivery system components within the tank may increase safety levels as a single gaseous non-oxidizing fuel in a storage vessel cannot support combustion even in the case of an internal electrical failure.

As discussed in more detail below, control devices, including controls and sensors, may be included in the integrated fuel delivery system. These control devices may be operated through remote systems. Remote systems include systems which do not require a sealing interface or any physical external penetration of the tank or gas pathway. In some embodiments, such control devices may be electromagnetically coupled within the tank, thus eliminating additional potential leakage interfaces. For example, remote systems and methods such as, for example, magnetic remote turning and linear movement across a stainless diaphragm, may be used to turn the solenoid valve or control other system devices.

As an example, sensors and actuators may be electromagnetically coupled to prevent leakage paths. An example electromagnetic coupling is indicated at 318. The magnetic field may be configured to couple the two coils together without requiring an external connection to the tank. As such, internal devices may be powered electromagnetically, including a battery that may be electromagnetically charged.

In some systems, a pressure regulator, such as pressure regulator 306, may include a sealed reference chamber 316 for monitoring gaseous leaks, such as hydrogen leaks. Such monitoring systems may enable operational control of the system. Further in some embodiments, additional monitoring may be used to identify leakage. For example, in some systems, the fuel line may be a dual-walled fuel line (including an inner wall and an outer wall). If hydrogen, or other gas, is detected between the inner and outer wall, a control signal may be sent and the solenoid may be shut off and an alarm activated.

Figure 4:
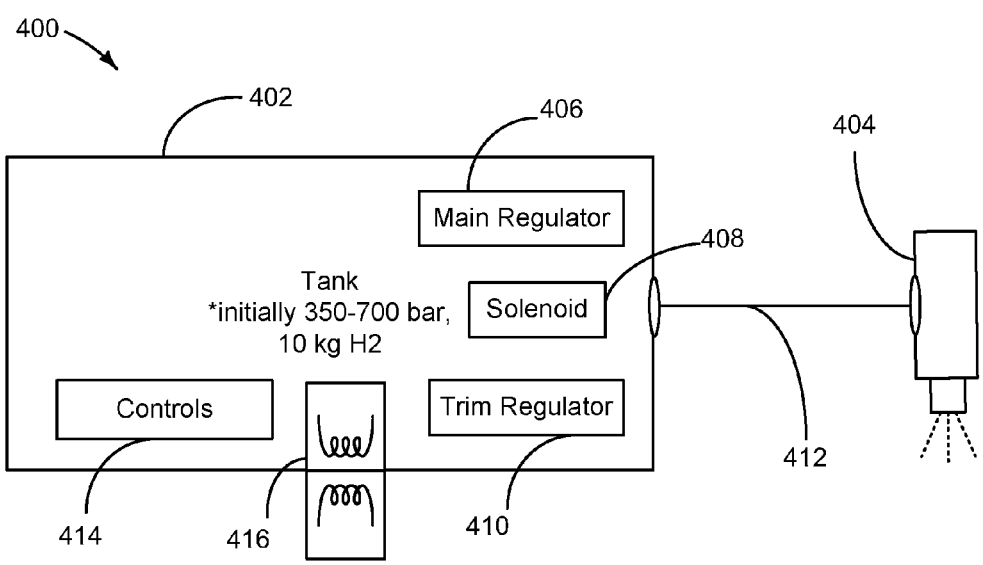
FIG. 4 is another schematic diagram of an exemplary embodiment of an integrated gaseous fuel delivery system.

Turning now to FIG. 4, another schematic diagram of an exemplary embodiment of an integrated gaseous fuel delivery system is provided. As shown, the integrated gaseous fuel delivery system 400 may include a tank 402 fluidically coupled to an injector 404. Tank 402 may be an integrated system tank such that the fuel delivery system components are substantially contained within the tank. For example fuel delivery system components, such as main regulator 406, one or more solenoids 408 and trim regulator 410 may be contained within tank 402. Gaseous fuel may be delivered from tank 402 at a regulated select pressure through a gas line or other suitable system to injector 404. The interface 412 schematically illustrates the fluidic coupling of the tank to the injector.

As discussed above, gas leakage pathways are reduced where the fuel delivery system components are internal to the tank. Additional reduction in gas leakage between the tank and the injector may be through use of a dual-walled fuel line or other similar early gas leakage detection system. Further, the configuration of the system may further reduce potential gas leaks. For example, one exemplary configuration to substantially reduce gas leakage pathways includes use of a cylinder head with a cast-in-place fuel rail using bottom feed injectors, although it should be appreciated that other systems may be used or incorporated to reduce fuel leakage.

In addition to the above, controls 414, including manually-operated controls, electrically-operated controls, gauges and sensors may be integrated into the contained fuel pathway and thus the tank. Regulation pressure, control signals, manual valve controls, and motive power can be, for example, electromagnetically coupled in the storage device, as indicated at 416. Any suitable remote techniques for monitoring and controlling the system may be used, for example, magnetic remote turning techniques may be used to turn the solenoid valve in response to system conditions. Thus, various internal devices, including controls, actuators, sensors, etc., and batteries to power such devices, may be powered electromagnetically. As such, the disclosed integrated fuel delivery system provides a tank or storage vessel which may be operated or powered via electromagnetic coupling to output a select pressurized gas to an injector or power plant with minimal fuel leakage into the external system.

Figure 5:
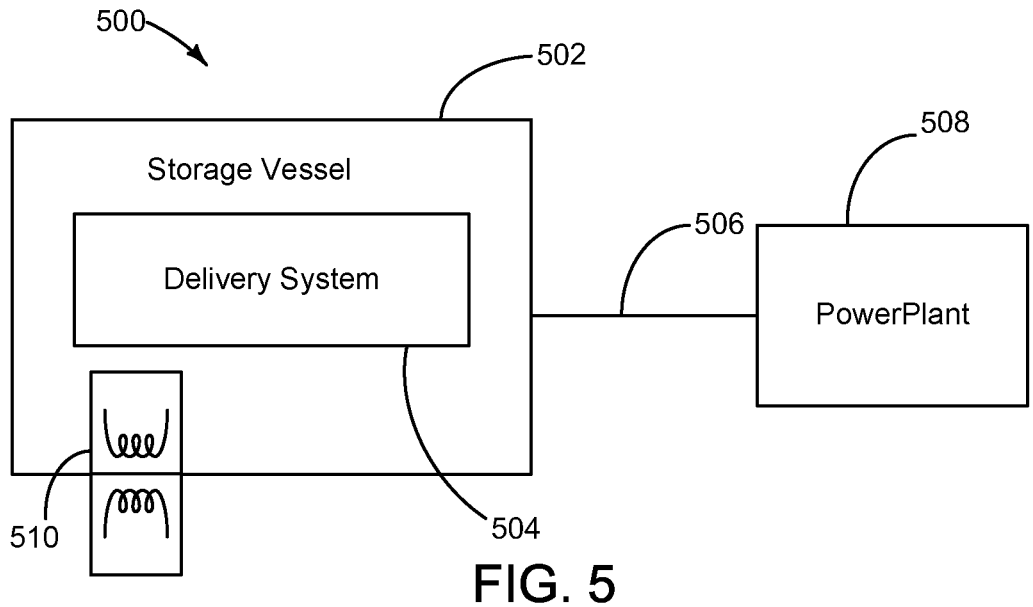
FIG. 5 is a schematic diagram of an exemplary embodiment of an integrated gaseous fuel delivery system.

FIG. 5 provides another illustration of the integrated system. As illustrated, an integrated system 500 includes a storage vessel 502, such as a gas tank, with a coupling 506 to a power plant 508. Contained or substantially contained within storage vessel 502 is delivery system 504. Remote controls may be used to provide operational information to delivery system 504. For example, controls and sensors may be electromagnetically coupled, indicated at 510, to operate the delivery system and generate a desired gas output at a select pressure.

It should be appreciated that the storage vessel may be any suitable gas tank, such as a hydrogen storage tank. The power plant may be an engine, such as a hydrogen engine, or, in some embodiments, a fuel cell. Regardless of the environment, the gas, such as hydrogen, may be stored such that it may be delivered at a select pressure to the power plant. Delivery system components may be substantially contained such that fuel/gas leakage is minimized. Remote methods may be used to operate and control the delivery system without penetrating the tank or the integrated delivery system components.

Figure 6:
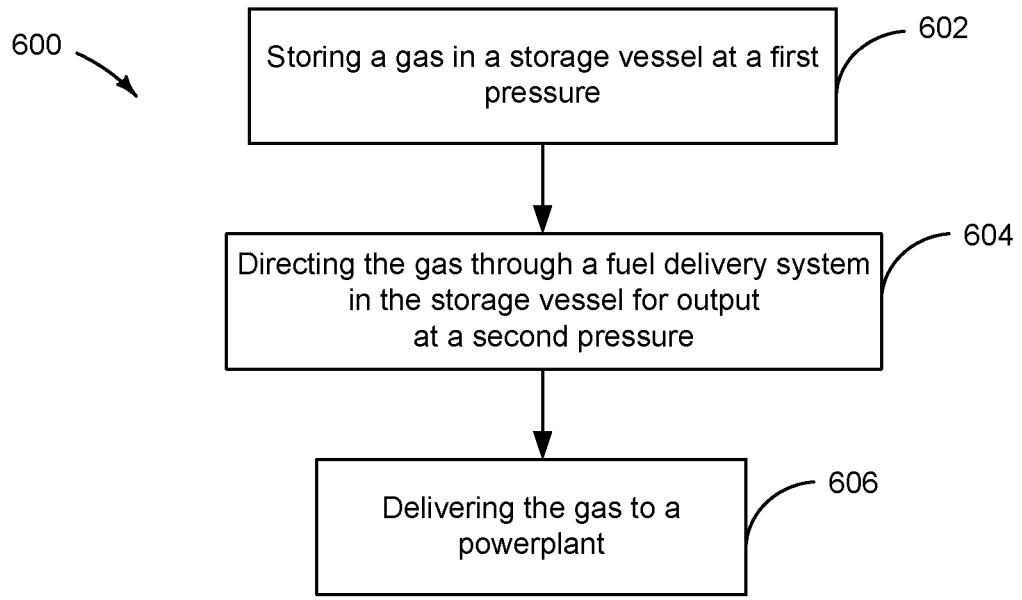
FIG. 6 is a flow diagram of an exemplary embodiment of a method to reduce leaks in a gaseous fuel delivery system.

FIG. 6 provides a flow diagram of an embodiment of a method to reduce leaks in a gaseous fuel delivery system, as indicated at 600. Although described in regards to driving a vehicle component, it should be appreciated that the method may be used to drive or generate fuel for other components or systems. Further, although described in regards to a hydrogen system, it should be appreciated that the system may be used with any other gaseous fuel system.

As illustrated, a gas, such as hydrogen, is stored in a storage vessel at an initial pressure, at 602. The gas may be directed through a fuel delivery system in the storage vessel for output at a second pressure, at 604. The second pressure, or regulated pressure, may be based on the configuration of the system for which the fuel is to be used. For example, the pressure may be decreased such that a lower pressure gas is outputted from the system. Various pressure regulators and solenoids may be part of the fuel delivery system. These pressure regulators and solenoids may be contained within the storage vessel. The gas may then be delivered to a powerplant, such as a vehicle engine, at 606. The gas may be delivered through an uninterrupted passage such that leakage from the system is minimized.

The following claims particularly point out certain combinations and subcombinations regarded as novel and nonobvious. These claims may refer to "an" element or "a first" element or the equivalent thereof. Such claims should be understood to include incorporation of one or more such elements, neither requiring, nor excluding tow or more such elements. Other combinations and subcombinations of the integrated fuel delivery system and the system, methods, processes, apparatuses, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An integrated gaseous fuel delivery system, comprising:
a storage tank to hold a gaseous fuel; and
a pressure regulation system disposed interior the storage tank and configured to regulate a pressure of gaseous fuel delivered from the storage tank, wherein the pressure regulation system is operated through a remote system external to the storage tank.

2. The fuel delivery system of claim 1, wherein the pressure regulation system includes a main regulator.

3. The fuel delivery system of claim 2, wherein the pressure regulation system includes a trim regulator.

4. The fuel delivery system of claim 1, wherein the pressure regulation system includes at least one solenoid.

5. The fuel delivery system of claim 1, wherein the gaseous fuel is hydrogen.

6. The fuel delivery system of claim 1, wherein the storage tank is configured to store the gaseous fuel at a storage pressure and the pressure regulation system is configured to output a regulated pressure fuel from the storage pressure.

7. The fuel delivery system of claim 1, wherein the pressure regulation system is operated through an electromagnetic coupling.

8. The fuel delivery system of claim 1, further comprising at least one sensor or actuator electromagnetically coupled to the storage tank.

9. The fuel delivery system of claim 1, further comprising a fuel line to an injector.

10. The fuel delivery system of claim 9, wherein the fuel line is a double-walled fuel line.

11. A gaseous fuel power system for a vehicle, comprising:
an integrated fuel delivery system, including a storage tank to hold a gaseous fuel and a pressure regulation system;
a powerplant to convert energy from the gaseous fuel into energy useable to power the vehicle; and
an uninterrupted passage fluidically coupling the storage tank to the powerplant.

12. The fuel power system of claim 11, wherein the powerplant is an internal combustion engine.

13. The fuel power system of claim 11, wherein the powerplant is a fuel cell.

14. The fuel power system of claim 11, wherein the gaseous fuel is hydrogen.

15. The fuel power system of claim 11, wherein the integrated fuel delivery system includes an at least one solenoid and an at least one pressure regulator.

16. The fuel power system of claim 11, wherein the integrated fuel delivery system includes an electromagnetically coupled control.

17. A method of reducing leaks in a gaseous fuel delivery system, the method comprising:
   storing a gaseous fuel at a first pressure within a storage tank;
   regulating pressure of the gaseous fuel to a second pressure, different than the first pressure, before the gaseous fuel exits the storage tank; and
   delivering the gaseous fuel from the storage tank to a powerplant via a substantially uninterrupted passage.

18. The method of claim 17, wherein regulating pressure of the gaseous fuel includes operating a pressure regulator internal the storage tank.

19. The method of claim 17, wherein delivering the gaseous fuel includes passage through a single interface between the tank and the powerplant.

* * * * *